US006378795B1

(12) United States Patent
Kelly et al.

(10) Patent No.: US 6,378,795 B1
(45) Date of Patent: Apr. 30, 2002

(54) METHOD AND APPARATUS FOR FORMING FOOD CLUSTERS

(75) Inventors: Joseph William Kelly, Grapevine; Debra Anne Kiner, Plano; Larry Carl Swarvar, Dallas, all of TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/532,469

(22) Filed: Mar. 22, 2000

(51) Int. Cl.[7] ............................. B02C 7/06; B02C 18/28
(52) U.S. Cl. ......................................... 241/223; 241/243
(58) Field of Search ........................ 426/503; 241/223, 241/236, 243

(56) References Cited

U.S. PATENT DOCUMENTS

| 2,696,650 A | * 12/1954 | Bettes, Jr. ................... 241/236 |
| 2,956,602 A | 10/1960 | Gronberg |
| 3,380,502 A | 4/1968 | Gronberg |
| 3,602,444 A | 8/1971 | Meyer |
| 3,874,604 A | 4/1975 | Gronberg et al. |
| 4,678,126 A | 7/1987 | Prentice et al. |
| 5,083,517 A | * 1/1992 | Stevens et al. ............. 241/243 |
| 5,954,278 A | 9/1999 | Bennett et al. |
| 6,196,483 B1 | 3/2001 | Jakobi |

FOREIGN PATENT DOCUMENTS

| WO | WO 93/25311 | * 12/1993 | .................. 241/243 |

* cited by examiner

*Primary Examiner*—Lowell A. Larson
(74) *Attorney, Agent, or Firm*—Colin P. Cahoon; Carstens, Yee & Cahoon

(57) ABSTRACT

An improved method and apparatus for the formation of food clusters by using a fingerwheel to break a bed of food product into clusters of a uniform size. After the food product, such as popcorn, and the coating that is placed on the product is mixed together, a bed of the mixture is formed. The bed is then forced through stationary fingers by the fingerwheel at an optimum temperature for forming clusters, thus breaking the bed into individual clusters. The average size of the clusters is determined by the spacing between the fingers on the fingerwheel and the stationary fingers when they are meshed together. Once the clusters are broken up, the clusters are sent to a sifter/cooler where the clusters are cooled and sifted before being combined

26 Claims, 6 Drawing Sheets

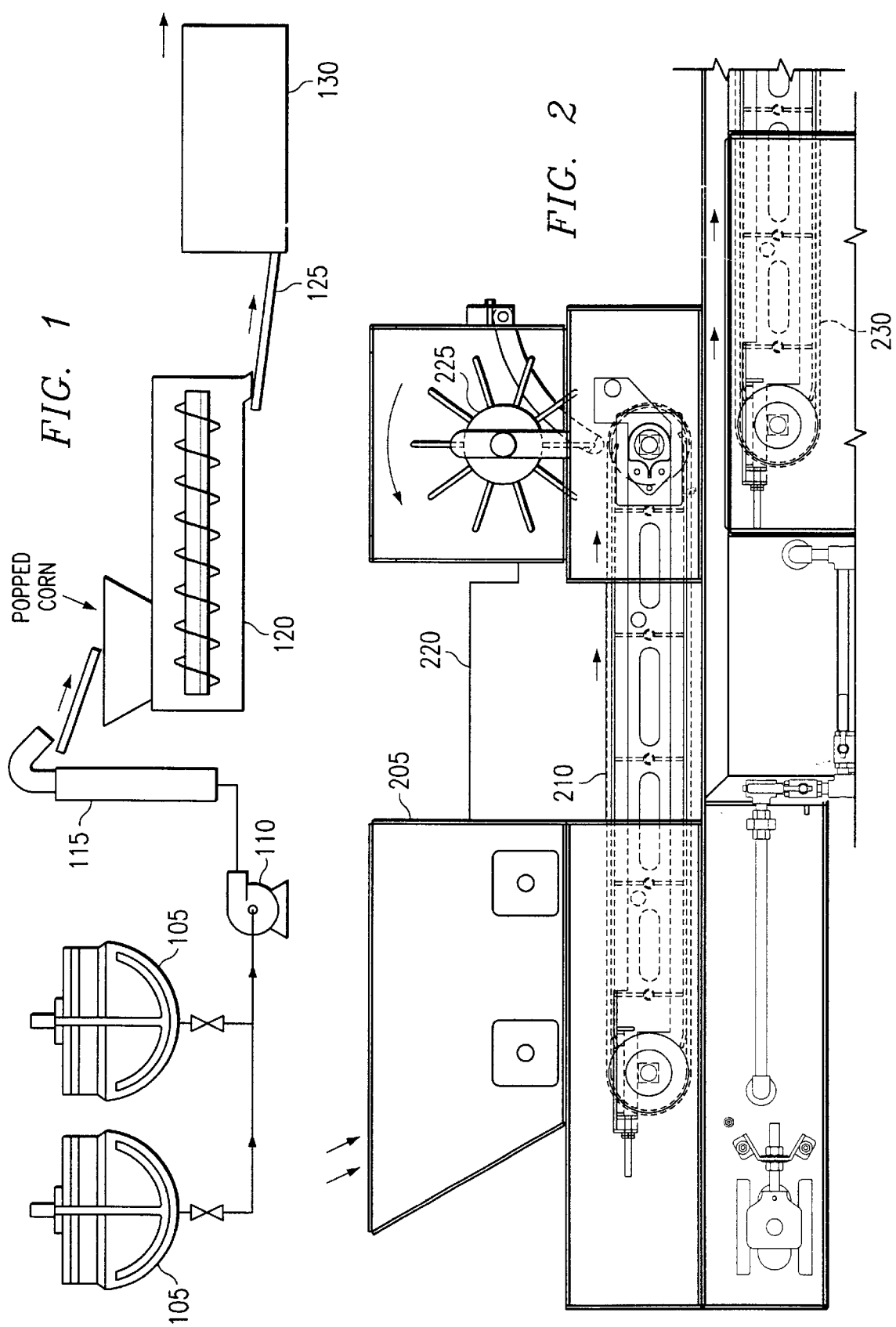

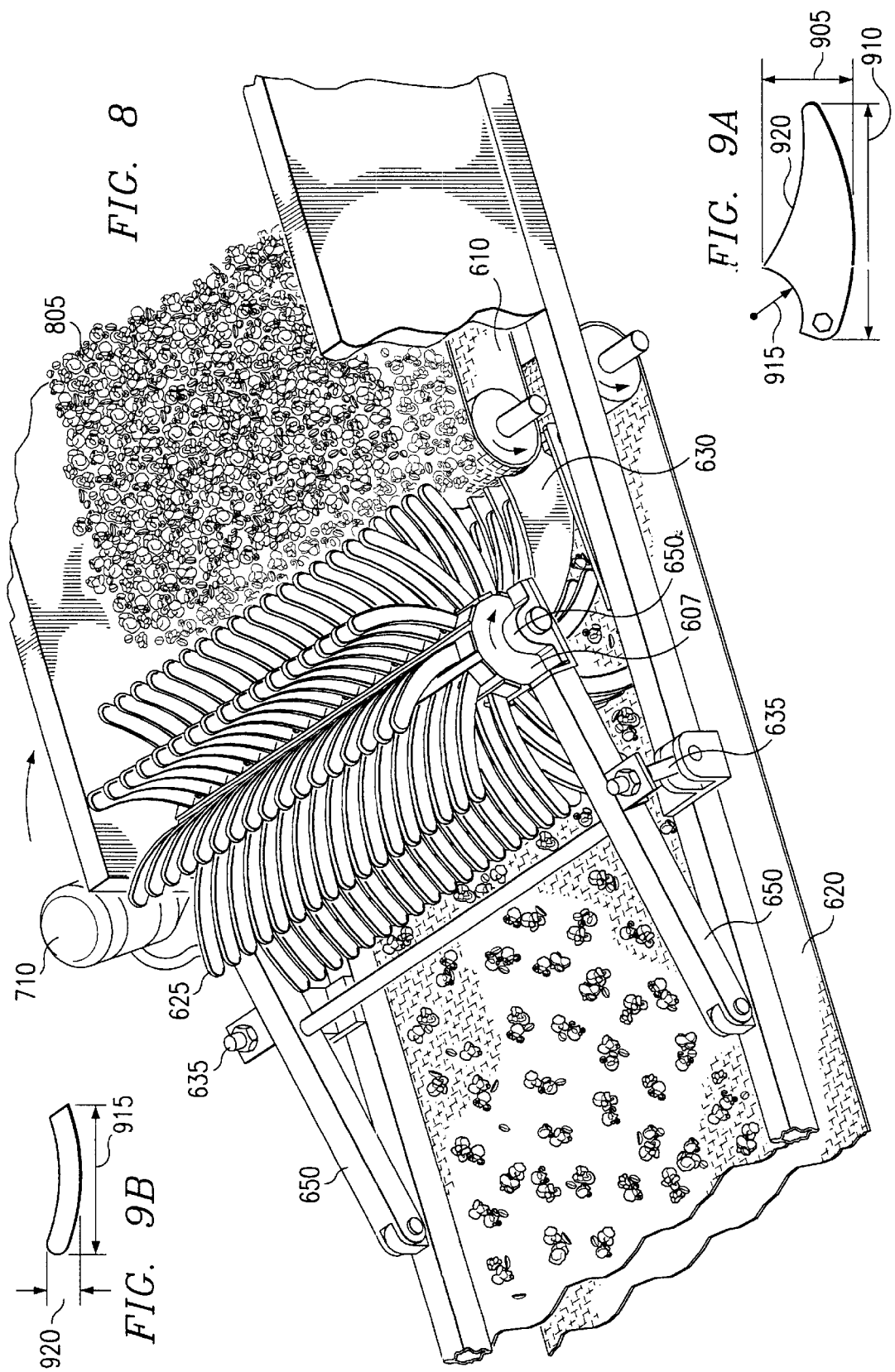

METHOD AND APPARATUS FOR FORMING FOOD CLUSTERS

BACKGROUND OF THE INVENTION

1. Technical Field

The present invention relates to an improved method and apparatus for processing coated food products and, in particular, to an apparatus which provides for the formation of food clusters with a controllable size and population.

2. Description of Related Art

Caramel popcorn has traditionally been manufactured by first popping raw corn in a dry roasting machine. Either a caramel coating or a butter toffee mass is then prepared in a suitable vessel by mixing sugar, corn syrup, butter, and other additives. Numerous variations of the mass are currently used in the art, but all usually contain sugar and corn syrup as the basic ingredients. This mass is constantly stirred while it is being heated until the prescribed melting temperature has been reached. Once the melting point of the coating is reached, the previously popped corn is then coated with the caramel mass, usually in a helix type continuous mixer.

Other types of food products have also been coated in a similar manner. In order to increase the appeal of such coated products, food product manufacturers have attempted to make caramel popcorn and other food products in clusters rather than single coated pieces. Peanuts have also been mixed with popcorn and joined together to form small clusters.

There is not currently a method in the prior art which may be used to provide a consistent size and uniformity of such clusters within the finished product. Rather, prior art methods typically produce an undesirable variation in the size of the clusters. This is due to the shortcomings of the current drum style cluster machine that is used to manufacture clustered food products. As a result, there is a significant amount of waste of the food product when using current methods of forming clusters because clusters of undesirable size are typically discarded. Consequently, there is a need for a method and apparatus for forming food clusters which allows greater control over the size of the food clusters and provides more consistency in the variation of the sizes of clusters produced.

SUMMARY OF THE INVENTION

The present invention provides uniformity in the formation of food clusters by using a fingerwheel to break a layer of the food product into clusters of a uniform size. After the food product, such as popcorn, and the coating that is placed on the product is mixed together, a bed of the mixture is formed. The bed is then forced through stationary fingers or slots by the fingerwheel at an optimum temperature for forming clusters, thus breaking the bed into individual clusters. The average size of the clusters is determined by the spacing between the fingers on the fingerwheel and the stationary fingers when they are meshed together. Once the clusters are broken up, the clusters are sent to a sifter/cooler conveyor where the clusters are cooled and sifted before being combined together to package.

The present invention provides much more control over the average size of the clusters produced than the prior art methods. The invention also reduces unnecessary waste because fewer oversize clusters are produced due to the greater control provided by the method of the invention.

The above as well as additional features and advantages of the present invention will become apparent in the following written detailed description.

DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings wherein:

FIG. 1 is a schematic diagram of a caramel corn system in which a preferred embodiment of the present invention may be implemented;

FIG. 2 is a side-view of a preferred embodiment of the initial stage of a cooler/sifter used in the present invention;

FIG. 8 is a perspective view of the preferred embodiment of FIGS. 6 and 7 in operation;

FIG. 9A is a side view of a stationary finger of FIGS. 6, 7, and 8; and

FIG. 9B is a side view of a rotating blade of FIGS. 6, 7, and 8.

DETAILED DESCRIPTION

Figure 3:
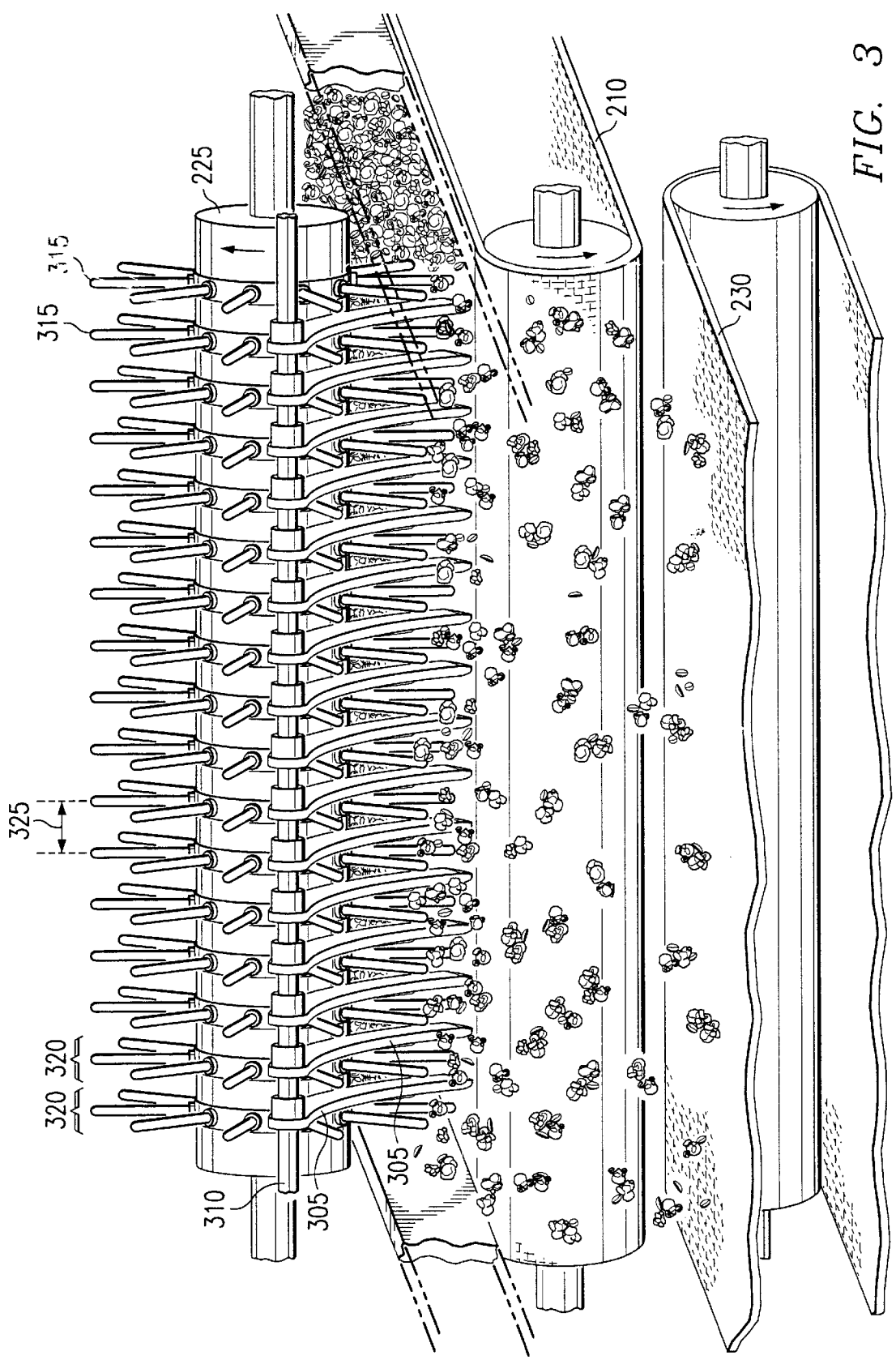
FIG. 3 is a perspective view of the fingerwheel of FIG. 2.

FIG. 1 is a schematic diagram of a caramel corn system in which a preferred embodiment of the present invention may be implemented. The coating product is placed in a jacketed, pre-mix kettle 105, and heated until the product is melted. A pump 100 is used to pump the caramel mixture through a thin film evaporator 115. The caramel mixture is then mixed with the popcorn in a jacketed ribbon coater 120. Additional products such as peanuts may also be added with the popcorn. A ribbon coater 120 then mixes the popcorn and caramel mixture using an auger style ribbon coater. Once the product is mixed together thoroughly, it is deposited onto a conveyor 125, typically at a temperature of 260° to 270° Fahrenheit, and sent to a cooler/sifter 130. The cooler/sifter 130 represents the component of the system in which a preferred embodiment of the invention is implemented.

FIG. 2 is a side-view of a preferred embodiment of the initial stage of the cooler/sifter 130 shown in FIG. 1. Like numerals are used throughout this description to describe similar or identical parts, unless otherwise indicated. After the product is mixed in the ribbon coater 120 and is deposited onto the conveyor 125, chunks of the product fall into the top of a spreader box 205. Once the product enters the spreader box 205, a spreader wheel within the spreader box 205 spreads the product across the upper conveyor 210 to form a bed. To make caramel corn clusters, a bed of caramel coated popcorn four inches thick is formed on the upper conveyor 210. A bed of the food product allows for easier control of temperature than a monolayer would allow. The upper conveyor 210 in the embodiment illustrated is a conveyor which conveys the bed of popcorn and caramel between Ultra High Molecular Weight (UHMW) polymer boards 220 which are placed on either side of the upper conveyor 210. UHMW boards 210 are preferred because the popcorn and caramel do not stick to it. Furthermore, the insulating value of UHMW boards 220 helps to retain heat.

The speed of the upper conveyor 210 should be chosen to allow the food product to reach the fingerwheel 225 at a temperature at which it is pliable enough to be broken into clusters without breaking the individual pieces into smaller pieces. For caramel popcorn this temperature is approximately 220° to 230° F. If the popcorn is allowed to cool much below this temperature, then the popcorn and/or peanuts may be broken into smaller pieces by the fingerwheel 225 resulting in excessive waste. The temperature of the room may be adjusted in order to assist in controlling the temperature at which the food product reaches the fingerwheel 225. Plastic or other suitable covers may also be used to hold the heat in if it is necessary to convey the product a greater distance. Conversely, fans may be placed above the cooler/sifter 130 in order to cool the food product to the appropriate temperature. Blowing clean air downward also prevents dust and other foreign particles from contaminating the product.

Once the product bed reaches the fingerwheel 225, it is sized into clusters the average size of which is dependent upon the spacing and dimensions of the fingerwheel 225 as described below. The product is then deposited onto a lower conveyor 230, placed below the upper conveyor 210, where it is conveyed to the cooler. The lower conveyor 230 runs at a much faster speed than the upper conveyor 210 to keep the clusters separated until they have been cooled to a temperature at which they will not stick together.

FIG. 3 is a perspective view of the fingerwheel 225 of FIG. 2 showing clusters of popcorn/caramel and peanuts that are formed and deposited onto the lower conveyor 230. The fingerwheel 225 may be driven using a motorized pulley which is a motor within the center of the fingerwheel that remains stationary while the outer housing turns. However, one skilled in the art will recognize that other drive mechanisms may be used. In this preferred embodiment, numerous pins 315 are attached to the outer housing of the motorized pulley. The number of rows of pins is determined by the width of the conveyor as well as the spacing between the pins 315 and the stationary fingers 305. All of the stationary fingers 305 are not labeled in FIG. 3 to avoid cluttering the figure. However, the fingers 305 are identical and are attached to a stationary rod 310 with equal spacing. The spaces between the stationary fingers 305 are sometimes referred to herein as "slots." Similarly, all of the pins 315 are not labeled in FIG. 3 but all are identical in shape, size, and spacing. As the motorized pulley 225 rotates in the direction shown by the arrow, the popcorn and caramel bed is forced through the stationary fingers 305 by the pins 315. This causes the pliable bed of product to be separated into small pieces or clusters.

The average size of these clusters is determined by both the spacing 325 between the pins 315 and the clearance between the pins 315 and the stationary fingers 305. The relative spacing between the pins 315 and fingers 305 may be varied to change the average size of the resulting clusters. The pins 315 can be removably attached to the motorized pulley 225 such that the spacing may be varied according to the needs of the manufacturer of the product. In one preferred embodiment, each row of the pins 315 contains approximately 10 to 16 pins around the circumference of the motorized pulley 225. If more pins 315 are placed in a given row the rpm necessary for operation may be reduced, thereby decreasing the amount of breakage of the product as it is forced through the stationary fingers 305. The desired rpm of the motorized pulley 225 should be relatively slow so that breakage of the product is minimized. For 10 pins 315 in one row 320, the rotational velocity of one preferred embodiment is approximately 20 to 30 rpm.

The pins 315 and the stationary fingers 305 may be constructed of stainless steel to give the rigidity required. The spacing 325 between the pins 315 may, for example, be set to approximately 1¼ inch to give clusters of an average size of approximately 1¼ by 1½ inch. If the fingers 305 are placed across the entire width of the upper conveyor 210, only approximately 2% of the clusters produced are of greater size than desired. In the prior art method of using a tumbler to produce clusters, the consistency of the number of clusters produced is not as good, producing approximately 15% of clusters of greater size than desired. Additionally, the prior art method results in the range of the percentage of the product which is formed into clusters being between 18% and 40%, whereas in the present invention this range is narrowed to 35% to 45%. Thus, much greater control over the size of the clusters and the amount of the clusters is realized using the present invention.

Figure 4:
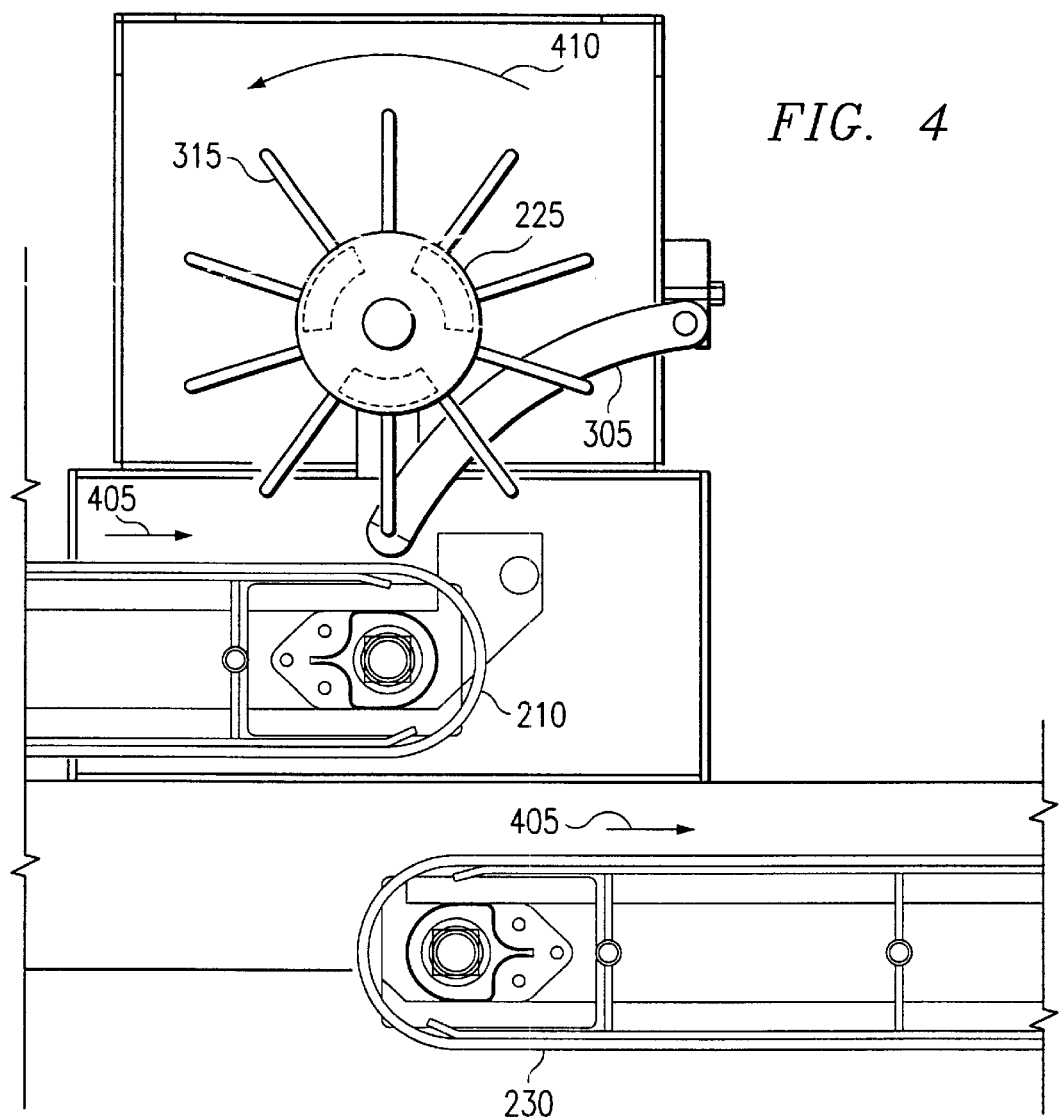
FIG. 4 is a cut-away side-view of the fingerwheel of FIGS. 2 and 3.

FIG. 4 is a cut-away side-view of the fingerwheel 225 and upper and lower conveyors 210, 230 of FIGS. 2 and 3. The fingerwheel 225 rotates in a counter-clockwise direction 410. The upper conveyor 210 moves in a direction 405 and a speed consistent with the direction and the rpm of the fingerwheel 225. As the food product bed is forced through the stationary fingers 305, it is separated into clusters of average size that depends on the spacing between the pins 315 and the stationary fingers 305. The clusters are then deposited on the lower conveyor 230, which moves at a faster speed than the upper conveyor 210. The lower conveyer 230 conveys the food clusters to a cooler/sifter unit. The cooler cools the product so that it does not stick together whenever the product is again joined together, such as when packaged, and the sifter removes the clusters which are too large from the product mixture.

Figure 5A:
FIG. 5A is a front view of the stationary finger of FIGS. 3 and 4.
Figure 5B:
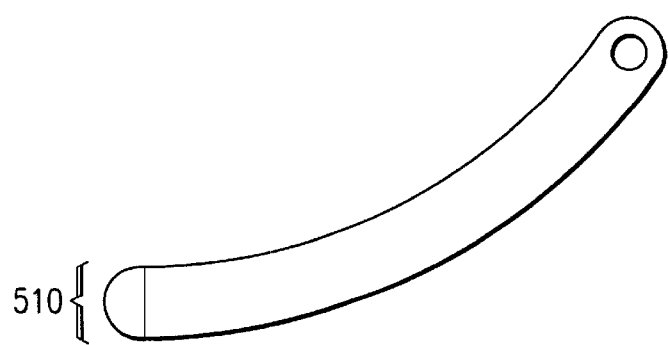
FIG. 5B is a side view of the stationary finger of FIGS. 3, 4, and 5A.

FIG. 5A is a front view of a stationary finger 305. The leading edge 505 of the finger 305 may be tapered in order to provide a sharper point with which to break up the food product bed. This prevents the popcorn kernels and peanuts themselves from being broken into pieces and tends to break the bed along the caramel joint between two pieces of popcorn or peanuts. FIG. 5B is a side view of a finger 305. The front-end 510 is rounded for the same reason that the leading edge 505 is tapered - to reduce breakage of popcorn and peanuts.

Figure 6:
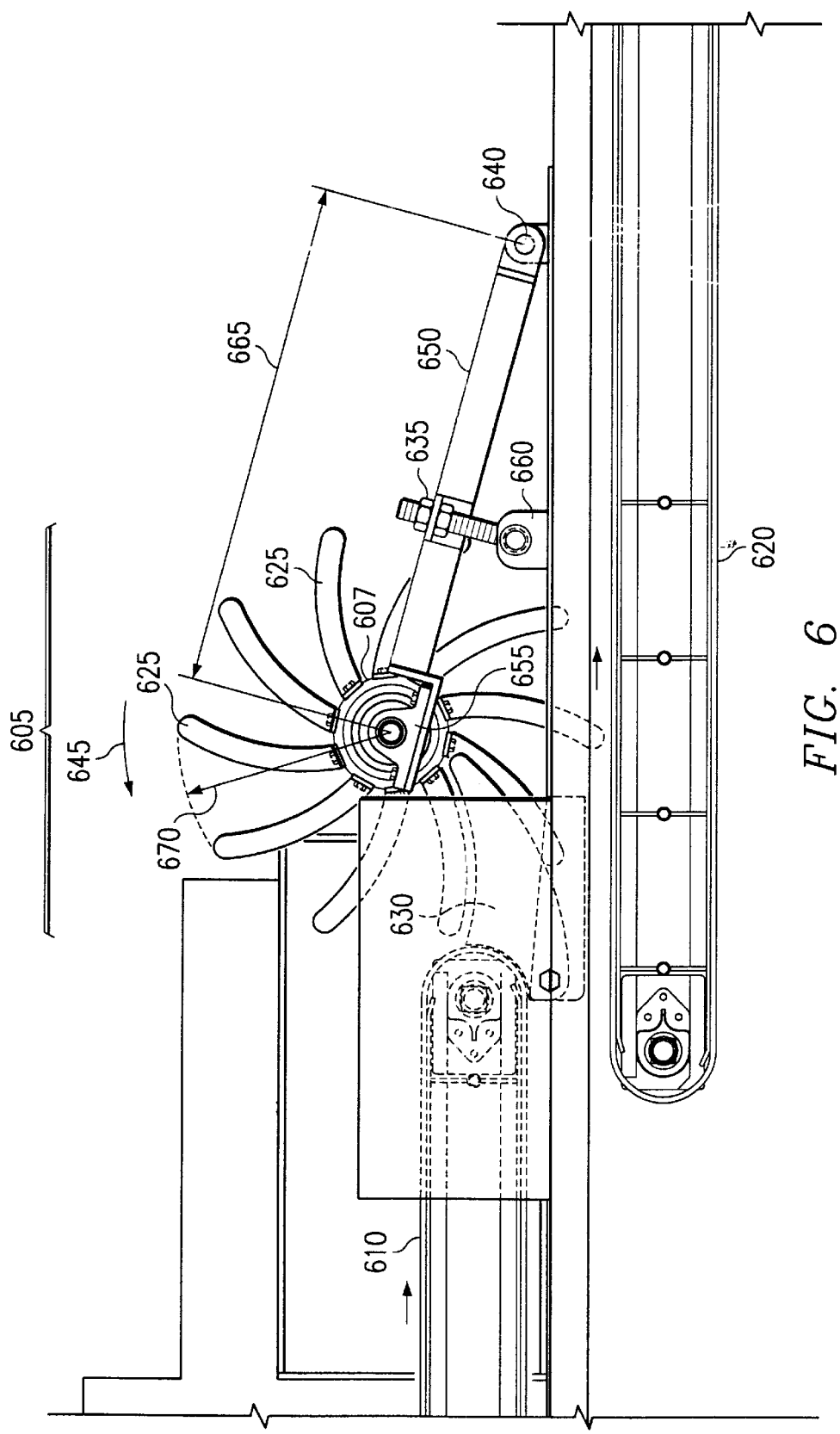
FIG. 6 is a side view of a preferred embodiment of the present invention.

FIG. 6 is a side view of another preferred embodiment of the present invention. The embodiment of FIG. 6 is basically the same of that shown in the embodiment of FIGS. 1 to 5, except that the location and design of the fingerwheel and stationary fingers are different. Rather than being placed directly above the upper conveyor 610, the fingerwheel 605 is placed on the end of the upper conveyor 610 and above the lower conveyor 620. This placement reduces the tendency of the clusters to be thrown upward after passing through the fingerwheel 605 and allow for increases in throughput. The shape of the pins 625 is changed from a cylindrical pin to a curved blade. Thus, the pins 625 will be referred to hereafter as rotating blades 625. The rotating blades 625 are more durable than pins 315 because of their shape.

The rotating blades 625 mesh with the stationary fingers 630, which are attached at the end of the upper conveyor 610. The stationary fingers 630 are curved upward on each end such that when food product leaves the upper conveyor 610 it tends to travel toward the center of the stationary fingers 630. This helps prevent the product from falling off either end of the stationary fingers 630 and encourages the product to travel through the slots in the stationary fingers 630 rather than around the ends. The rotating blades 625 are curved in the same shape as tops of the stationary fingers 630 such that the rotating blades 625 mesh with the tops of the stationary fingers 630 along the length of the rotating blades 625 at the same time. The rotating blades 625 are attached to a roll shaft 607 at the center of the fingerwheel 605. The roll shaft 607 may be driven by a geared electric motor attached to the end of the roll shaft. The rotating blades 625 in turn are driven in a counter-clockwise direction 645. The roll shaft 607 is attached to a support arm 650 on both ends of the roll shaft 607 using bearing structures 655. The support arms 650 are pivotally connected at one end 640.

The height of the fingerwheel 605 may be made adjustable by placing threaded supports 635 for the support arms 650 between the roll shaft 607 and the hinges 640. By adjusting the relative position of the support arms 650 to a stationary support 660, the spacing between the rotating blades 625 and the upper conveyor 610 may be adjusted. Preferably the roll shaft operates as close as possible to the ends of stationary fingers 630 to help prevent product bypassing the ends of the fingers 630. The stationary fingers 630 are also placed as close as possible to the upper conveyor 610 for the same purpose.

In one preferred embodiment the fingers 630 and the blades 625 are fabricated from $3/8$ inch #304 stainless steel sheet stock. The support arm 650 may be fabricated from 2×2×¼ inch wall tubing with the length 665 of the support arm 650 being approximately $26^{9}/_{16}$ inches. All thread support/adjustment 635 may be 1 inch in diameter with nuts on either side of a flange attached to the support arm 650. The radius 670 of the fingerwheel 605 in this preferred embodiment is approximately $11^{5}/_{32}$ inches.

Figure 7:
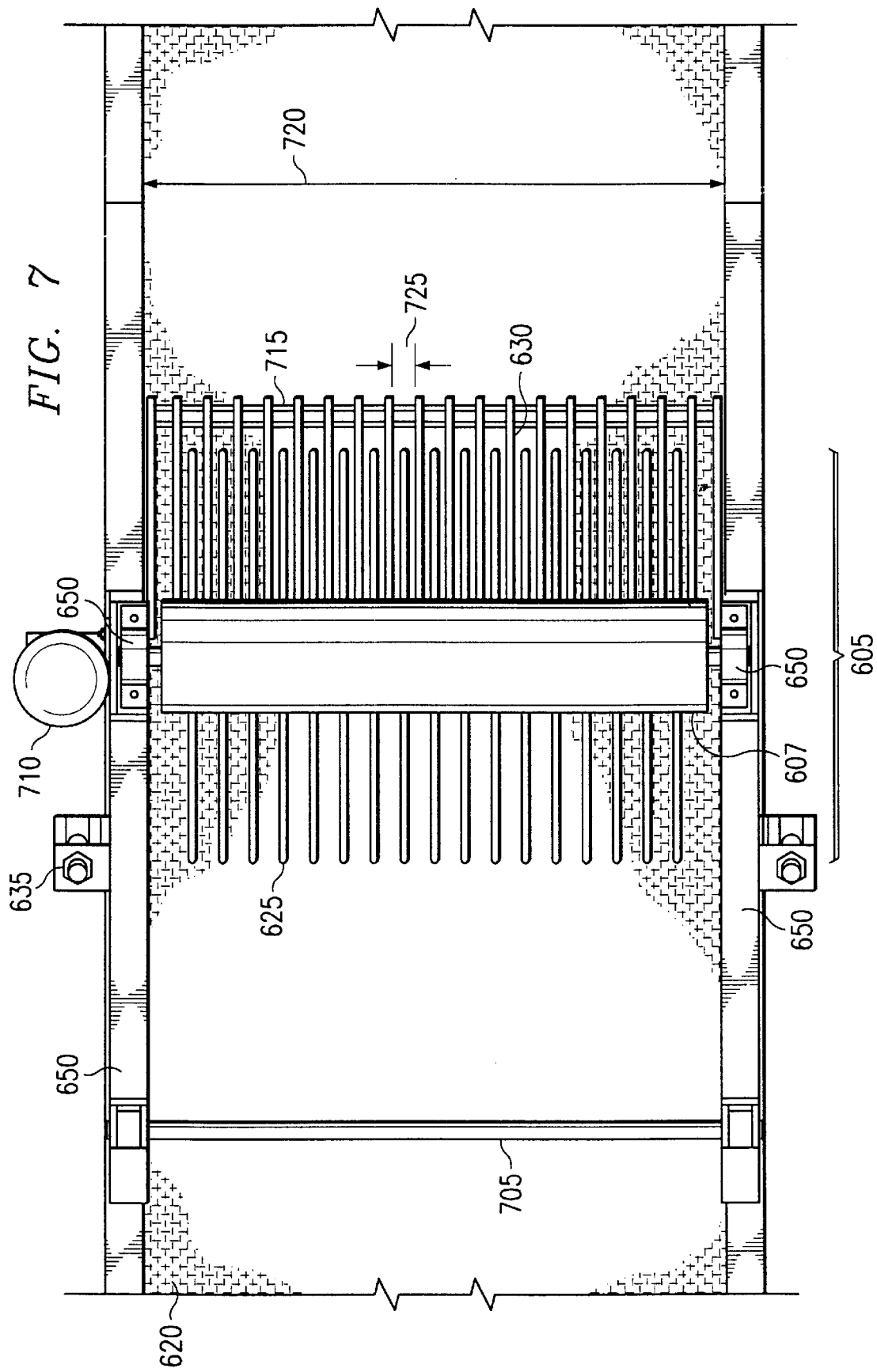
FIG. 7 is a top view of the preferred embodiment shown in FIG. 6.

FIG. 7 is a top view of the preferred embodiment shown in FIG. 6. A 1 inch diameter shaft 705 extends across the top of the lower conveyor 620 and provides lateral support for the support arm 650. An electric motor 710 is used to drive the fingerwheel 605. The motor 710, in one embodiment, is a variable rpm (0 to 75) gear motor which is connected to a gearbox that is attached to the inner shaft of the roll shaft 607. The roll shaft 607 in the embodiment illustrated has a 6 inch outside diameter with ½ inch wall and contains end caps through which the 1 inch diameter inner-shaft runs. The stationary fingers 630 are supported by a 1 inch hex shaft 715.

For a distance 720 of approximately 31¼ inches between the walls of the conveyors, approximately 18 stationary fingers 630 are used in accordance with a preferred embodiment and 17 rows of 10 blades 625 are needed. The distance 725 between two of the stationary fingers 630 is typically 1¼ inch. However, one skilled in the art will recognize that the number of blades, the number of fingers, and the spacing between them may be varied to obtain various average cluster sizes. The blades 625 and the fingers 630 are typically ⅜ inch wide and are equally spaced across the width of the conveyor. Each row of blades 625 on the fingerwheel 605 is also equally spaced from the next row.

FIG. 8 is a perspective view of the preferred embodiment of FIGS. 6 and 7 in operation. A bed of popcorn and caramel 805 is fed into the cluster sizing wheel while it is rotating at approximately 17–20 rpm. This gives a throughput of approximately 3,000–4,000 lbs/hr. The bed is broken up as the blades 625 pass through the stationary fingers 630 and is deposited onto a lower conveyor 620. The lower conveyor 620 runs at a higher speed such that the clusters do not touch each other until they have passed through the cooler and cooled to the point that they will no longer stick together when they touch each other.

FIG. 9A is a side view of the finger 630 used in the embodiment illustrated in FIGS. 6–8. The height 905 of the finger is approximately $5^{3}/_{8}$ inches and the length 910 is approximately 13¾ inches. The radius 915 of the finger 630 is determined by the shape of the of the upper conveyor 610. FIG. 9B is a side view of blade 625 used in the embodiment illustrated in FIGS. 6–8. The overall height 920 of the blade 625 is approximately $^{15}/_{16}$ of an inch and the length 915 is approximately 8¼ inches. The curvature of the blade 625 is matched to the corresponding shape 920 of the finger 630 such that they mesh together. The thickness of the blade 625 and the finger 630 is typically ⅜ of an inch and all edges are rounded off to reduce the amount of "angel hair" or strings of caramel formed during operation.

While the invention has been particularly shown and described with reference to a preferred embodiment, it will be understood by those skilled in the art that various changes in form and detail may be made therein without departing from the spirit and scope of the invention. For example, the dimensions may be changed to increase or decrease the overall size of the fingerwheel; the shapes of the fingers may be changed as well as the dimensions between them to obtain clusters of different average size; the individual materials may be changed to other comparable materials which accomplish the same purpose; and food products other than popcorn and peanuts may be used. Further, the means for breaking up the product bed need not be a fingerwheel design, but could include any number of devices used to mechanically force the product bed through a plurality of slots. For example, fingers could be attached to a conveyor-like mechanism and configured to pass through a plurality of stationary slots. The slots could also be designed to be moveable rather than stationary such that the fingers and the slots travel in opposite directions.

What is claimed is:

1. An apparatus for breaking a bed of food product on a first conveyor into clusters prior to depositing said food product on a second conveyor wherein said bed of food product comprises a bed of popcorn with a sticky coating, said apparatus having a support structure and comprising:
   (a) a rotating member configured for attachment proximately at an end of said first conveyor for severing said bed of food product, said rotating member comprising a drive shaft and a first plurality of fingers attached to and extending radially from said drive shaft; and
   (b) a second plurality of fingers configured for meshing with said first plurality of fingers, wherein a row of said first plurality of fingers may be rotated through said second plurality of fingers to break said bed of food product into clusters.

2. The apparatus of claim 1 wherein said first plurality of fingers are curved blades.

3. The apparatus of claim 2 wherein said first plurality of fingers comprises at least six rows of at least ten blades per row.

4. The apparatus of claim 3 wherein said second plurality of fingers comprises at least ten fingers rigidly attached to said support structure such that all rows of said first plurality of fingers pass through a plurality of slots in said second plurality of fingers when said rotating member is rotated one full turn.

5. The apparatus of claim 4 wherein the distance between adjacent fingers of said second plurality of fingers is between three-quarters of an inch and two inches.

6. The apparatus of claim 5 wherein the distance between adjacent fingers on a row of said first plurality of fingers is between three-quarters of an inch and two inches.

7. The apparatus of claim 4 wherein said first plurality of fingers are equally spaced across said plurality of rows and said second plurality of fingers are equally spaced such that said first plurality of fingers pass centrally through said plurality of slots in said second plurality of fingers.

8. The apparatus of claim 7 wherein a radius of said rotating member is between eight inches and twenty-four inches.

9. The apparatus of claim 1 further comprising:
   (c) two bearings, each attached to an end of said drive shaft; and
   (d) two support arms, each having a first and a second end, wherein the first end of each of said two support arms is attached to one of said two bearings and wherein a second end of each of said two support arms is attached to a support structure.

10. The apparatus of claim 9 wherein said two support arms further comprise two adjustable linkages extending downward from each support arm to said support structure wherein a length of said two adjustable linkages determines a height of said rotating member.

11. An apparatus for breaking a bed of product on a first conveyor into clusters prior to depositing product on a second conveyor, said apparatus having a first conveyor and a second conveyor for transporting said product wherein said first conveyor is positioned at a higher elevation than said second conveyor and wherein an end of said first conveyor is located above an end of said second conveyor, said apparatus further comprising:
   (a) a drive shaft having a first end and a second end;
   (b) a first plurality of fingers extending radially outward from said drive shaft wherein said plurality of fingers are equally spaced around the circumference of said drive shaft in a plurality of rows;
   (c) a first support arm having an upper end and a lower end wherein said upper end of said first support arm is attached to said first end of said drive shaft;
   (d) a second support arm having an upper end and a lower end wherein said upper end of said second support arm is attached to said second end of said drive shaft;
   (e) a support structure wherein said lower end of said first support arm, said lower end of said second support arm, said first conveyor, and said second conveyor are connected to said support structure;
   (f) a second plurality of fingers connected to said support structure for meshing with said first plurality of fingers wherein said second plurality of fingers are located adjacent to said end of said first conveyor such that when said drive shaft is rotated each finger on a row of said first plurality of fingers passes through a slot formed between adjacent fingers in said second plurality of fingers;
   (g) a first adjustable link having an upper end and a lower end wherein said upper end of said first adjustable link is connected to said first support arm and wherein said lower end of said first adjustable link is connected to said support structure;
   (h) a second adjustable link having an upper end and a lower end wherein said upper end of said second adjustable link is connected to said second support arm and wherein said lower end of said second adjustable link is connected to said support structure; and
   (i) a first bearing structure for connecting said upper end of said first support arm to said first end of said drive shaft wherein a housing of said first bearing structure is rigidly attached to said upper end of said first support arm;
   (j) a second bearing structure for connecting said upper end of said second support arm to said second end of said drive shaft wherein a housing of said second bearing structure is rigidly attached to said upper end of said second support arm;
   (k) a third bearing structure for connecting said lower end of said first support arm to said support structure wherein a housing of said third bearing structure is rigidly attached to said lower end of said first support arm; and
   (l) a fourth bearing structure for connecting said lower end of said second support arm to said support structure wherein a housing of said fourth bearing structure is rigidly attached to said lower end of said first support arm.

12. The apparatus of claim 11 wherein said first plurality of fingers are curved blades.

13. The apparatus of claim 12 wherein said first plurality of fingers comprises at least six rows of at least ten blades per row.

14. The apparatus of claim 13 wherein the distance between adjacent fingers of said second plurality of fingers is between three-quarters of an inch and two inches.

15. The apparatus of claim 14 wherein the distance between adjacent fingers on a row of said first plurality of fingers is between three-quarters of an inch and two inches.

16. The apparatus of claim 15 wherein said first plurality of fingers are equally spaced across said plurality of rows and said second plurality of fingers are equally spaced such that said first plurality of fingers pass centrally through a plurality of slots in said second plurality of fingers.

17. The apparatus of claim 16 wherein a radius of said fingerwheel is between eight inches and twenty-four inches.

18. A method of forming product clusters from a product bed comprising popcorn and a sticky coating, said method comprising the steps of:
   (a) forming said product bed;
   (b) maintaining said product bed at an optimum temperature for forming said product clusters; and
   (c) mechanically forcing the product bed through a plurality of slots such that said product bed is reduced to clusters and individual pieces of product.

19. The method of claim 18 wherein said forcing step (c) is performed by a rotating fingerwheel wherein a plurality of fingers in said finger wheel pass through said plurality of slots to force the product bed through said plurality of slots.

20. The method of claim 19 further comprising the steps:
   (d) maintaining separation between said clusters and said individual pieces and
   (e) cooling said clusters and said individual pieces prior to packaging said clusters and said individual pieces.

21. The method of claim 18 wherein said optimum temperature at step (b) is between 220 and 230 degrees Fahrenheit.

22. The method of claim 21 wherein said product bed is approximately four inches thick.

23. The method of claim 22 wherein said product bed is formed using a spreader box.

24. The method of claim 18 wherein prior to step (c), the product bed is transported to said plurality of slots on a first conveyor and further comprising the step of (e) transporting said clusters and said individual pieces to a cooler on a second conveyor after step (c) wherein said second conveyor runs at a higher speed than said first conveyor.

25. An apparatus for breaking a bed of product on a first conveyor into clusters prior to depositing said product on a second conveyor, said apparatus having a support structure and comprising:
  (a) a rotating member configured for attachment proximately at an end of said first conveyor for severing said bed of food product, said rotating member comprising a drive shaft and a first plurality of fingers attached to and extending radially from said drive shaft;
  (b) a second plurality of fingers configured for meshing with said first plurality of fingers, wherein a row of said first plurality of fingers may be rotated through said second plurality of fingers to break said bed of food product into clusters;
  (c) two bearings, each attached to a respective end of said drive shaft; and
  (d) two support arms, each having a first and a second end, wherein said first end of each of said two support arms is attached to one of said two bearings and wherein a second end of each of said two support arms is attached to a support structure and wherein said two support arms further comprise two adjustable linkages extending downward from each support arm to said support structure wherein a length of said two adjustable linkages determines a height of said rotating member.

26. A method of forming product clusters, said method comprising the steps of:
  (a) forming said product bed;
  (b) maintaining said product bed at an optimum temperature for forming said product clusters;
  (c) transporting said product bed to a plurality of slots using a first conveyor;
  (d) mechanically forcing said product bed through said plurality of slots such that said product bed is reduced. to clusters and individual pieces of product; and
  (e) transporting said clusters and said individual pieces to a cooler on a second conveyor wherein said second conveyor runs at a higher speed than said first conveyor.

* * * * *